United States Patent Office 3,046,110
Patented July 24, 1962

3,046,110

PROCESS OF MAKING PRINTING PLATES AND LIGHT SENSITIVE MATERIAL SUITABLE FOR USE THEREIN

Maximilian Paul Schmidt, Wiesbaden-Biebrich, Germany, assignor, by mesne assignments, to Azoplate Corporation, Murray Hill, N.J., a corporation of New Jersey No Drawing. Filed Jan. 2, 1962, Ser. No. 163,874
Claims priority, application Germany Feb. 1, 1950
64 Claims. (Cl. 96—33)

This invention relates to light sensitive materials suitable for the production of lithographic printing plates and for other purposes and in particular to positive working photosensitive materials of the type described in U.S. patent application Serial No. 174,556, filed July 18, 1950, by Maximilian Paul Schmidt, and now abandoned.

The application Serial No. 174,556 refers to the preparation of photosensitive material by coating a specific type of water-insoluble diazo compounds on a suitable material, the water-insoluble diazo compounds being derived from 2-diazo-naphthol-(1) or 1-diazo-naphthol-(2)—another well-known designation is naphthoquinone-(1,2)-diazide (2) and naphthoquinone-(1,2)-diazide (1), respectively—and having the chemical constitution of esters or amides of a sulfo acid or a carboxylic acid of these diazo naphthols. This sensitized material is then exposed to light through a master to decompose the diazo compound in the light struck areas and convert it into an alkali-soluble compound which is then removed by washing with an alkaline solution. Thus a positive image of undecomposed diazo compound is obtained from a positive original. This image may be heated to make it receptive to greasy printing inks so that the exposed and developed material may be used as a lithographic plate. Exposure to heat may not be necessary in order to increase the receptiveness of the image for greasy ink, if a resin or fatty acid or both are incorporated in the light sensitive layer with the diazo compound.

It has now been found that water-insoluble diazo compounds containing several naphthoquinone-(1,2)-diazide-residues in the molecule, obtained by the reaction of 1 mole of an amino-hydroxy compound with at least 2 moles of a naphthoquinone-(1,2)-diazide-sulfonic acid or its chloride or by the reaction of 1 mole of a compound containing several amino groups with at least 2 moles of the naphthoquinone-diazide-sulfonic acid component, may also be used in positive working photo-lithographic materials.

Such water-insoluble diazo compounds suitable for practicing the present invention correspond with the general formula

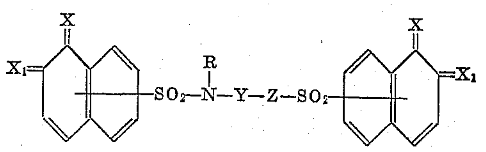

in which X and $X_1$ are $N_2$ or O, those attached to the same ring being different, Y is an organic linkage such as one or more arylene or alkylene groups, which may be substituted with other groups such as carbonyl, alkyl, alkylene, heterocyclic groups, alkoxy groups, aryl groups, aryloxy groups, hetero groups, cycloalkyl groups, halogens and other groups; Z is oxygen or a —$NR_1$— group; and R and $R_1$ are hydrogen, lower alkyl groups, or aryl groups. R and $R_1$ may be the same or different and may be substituted with other groups, where they are lower alkyl or aryl groups.

Compounds which are suited for the reaction with a plurality of moles of a naphthoquinone-(1,2)-sulfonic acid chloride may be, for example, aromatic hydrocarbons substituted simultaneously by hydroxyl and amino groups or substituted by several amino groups, aliphatic or aliphatic-aromatic diamines, aliphatic or aliphatic-aromatic amines containing one or several hydroxyl groups. Aromatic hydrocarbons which are linked together by other groups or rings and which contain substituents of the kind stated heretofore are also suitable as reaction components. For example, p-amino-phenol, 2,7- or 1,5-amino-naphthol, 4,4′-amino-hydroxy-diphenyl, 2′-amino-4-hydroxy-benzophenone, 2-amino-7-hydroxy-carbazole, p-phenylene-diamine, benzidine, 2,7-diamine-naphthalene, 4,4′-diamino-diphenylether, 4,4′-diamino-diphenyl-thioether, 4,4′-diamino-diphenylsulfone, 4,4′-diamino-diphenylmethane, 4,4′-diamino-benzophenone, 4,4′-diamino-dibenzyl, 4-4′-diamino-stilbene, 2,7-diamino-fluorene, 2,7-diamino-diphenyleneoxide, 2,7-diamino-carbazole, 1,1-bis-(4-aminophenyl)-cyclohexane and N,N′-bis-(4-amino-phenyl)-piperazine, ethylenediamine, 1,6-hexylenediamine or 4-amino-benzylamine may be used.

The naphthalene nucleus of the naphthoquinone-(1,2)-diazide residues can be substituted, for example, with halogens. However, sulfonic acid groups should be omitted. Also stronger basic groups, such as amino- or dimethylamino groups, should preferably not be included because it is customary in the printing process to treat the printing plates with acids in order to keep the background clean.

The following compounds, which are referred to in the following examples, represent diazo compounds which are useful according to the present invention.

*Formula 1*

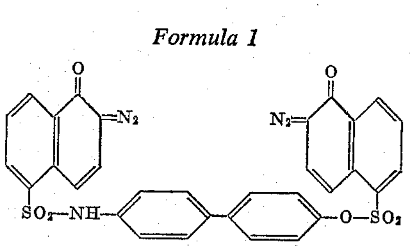

*Formula 2*

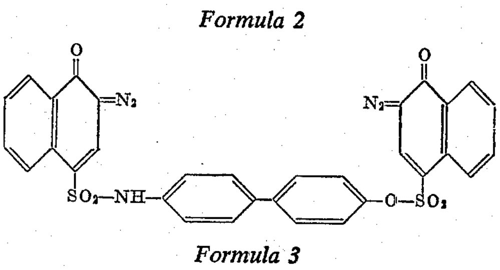

*Formula 3*

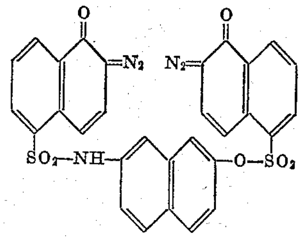

*Formula 4*

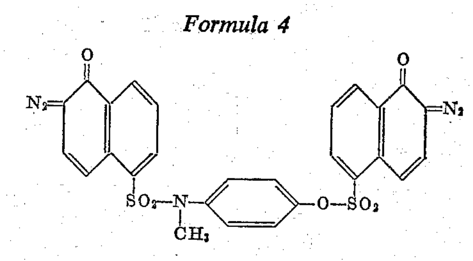

*Formula 5*
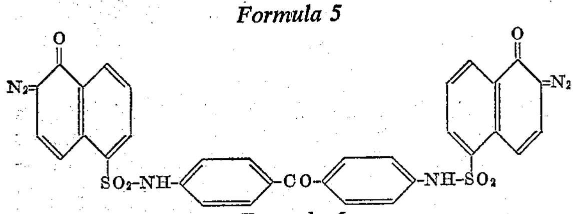
*Formula 6*
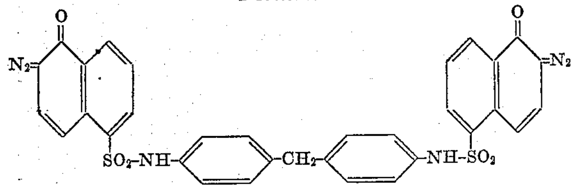
*Formula 7*
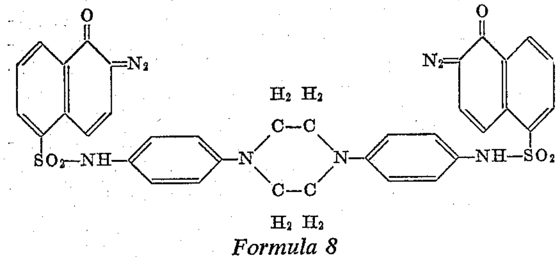
*Formula 8*
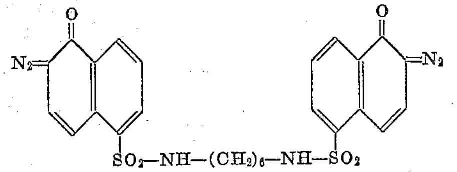
*Formula 9*
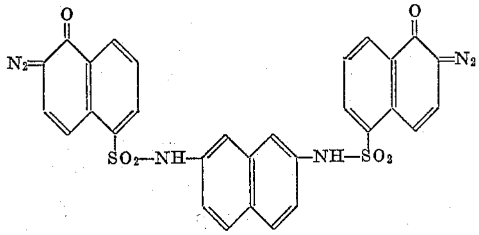
*Formula 10*
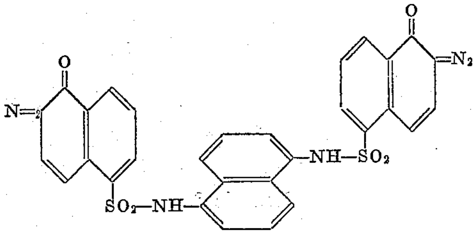
*Formula 11*
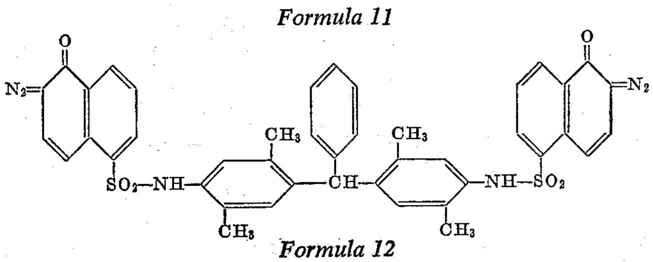
*Formula 12*
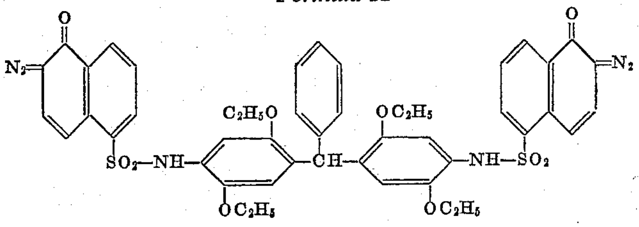
*Formula 13*
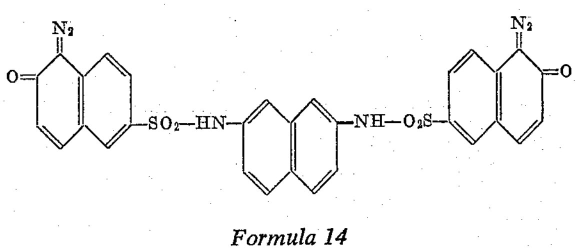
*Formula 14*
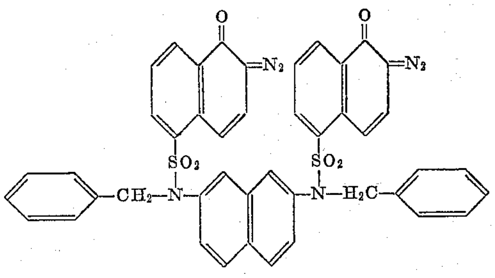
*Formula 15*
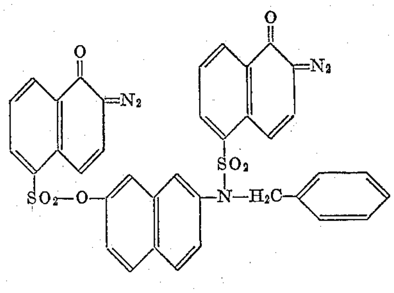
*Formula 16*
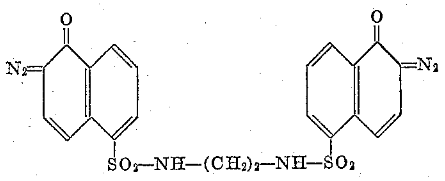
*Formula 17*
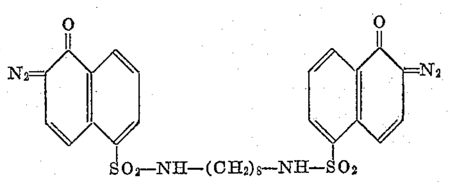

Formula 18

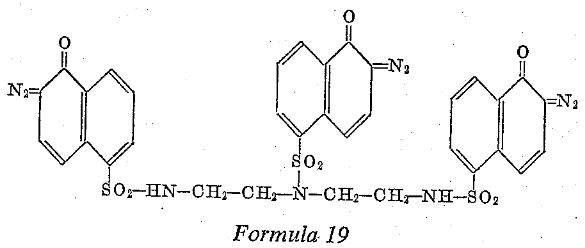

Formula 19

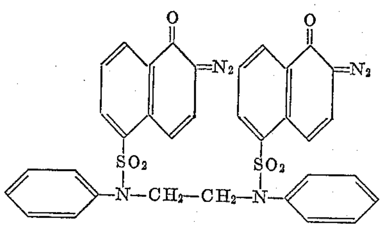

Formula 20

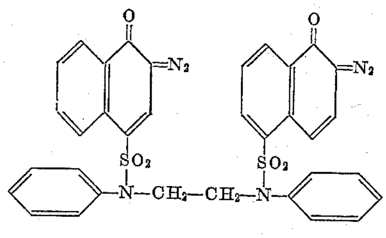

Formula 21

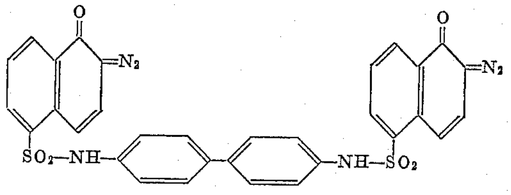

Formula 22

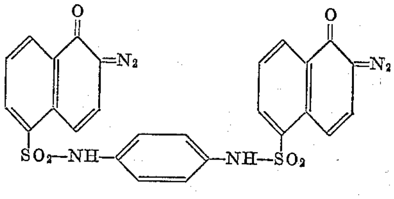

Formula 23

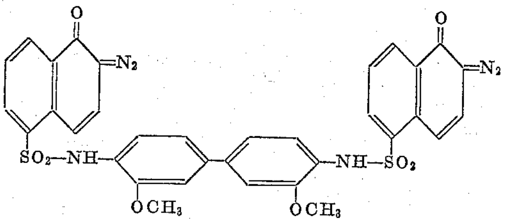

Formula 24

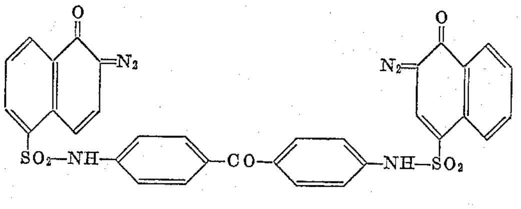

Formula 25

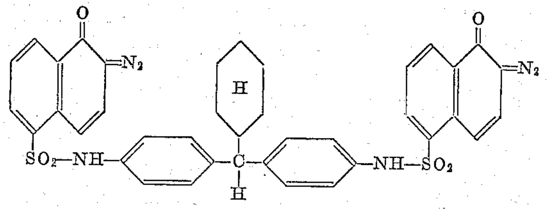

The images should be developed with alkaline solutions which are as weak as possible. Good results are generally obtained by using 3–5 percent trisodium phosphate solutions or disodium phosphate solutions of somewhat higher concentration. Aqueous solutions of other alkalies, as, for example, sodium carbonate or caustic soda, may also be used. Organic solvents such as alcohol may be added to these alkaline solutions. Generally, the weakest alkali capable of removing the background should be chosen.

If, after development, the image is heated until a change of color occurs, or if alkali-soluble resins or fatty acids or mixtures of both are incorporated into the light sensitive layer, it has been found that the receptive power of the positive diazo image for greasy printing ink may be still further improved.

The compounds for the lithographic material and process of this invention can be prepared by following known methods. In most cases, they can be obtained in a simple manner by the reaction in alkaline solution of the naphthoquinone- 1,2-diazide-sulfochlorides with an amino-hydroxy-compound or a compound containing several amino groups. If water insoluble components are used, an additional solvent may be added.

Most of the diazo compounds useful according to this invention are yellow products and generally it is difficult to dissolve them in the solvents which are commonly used. They dissolve more readily, for example, in dioxane, ethylene glycol monomethyl ether or methylethyl ketone, pyridine bases or combinations of these solvents. When diazo compounds are used which are very difficultly soluble in organic solvents, it is advisable to use them in admixture with more readily soluble diazo compounds in order to avoid the necessity for repeated coating of these products on the support, to obtain a layer of sufficient thickness. The use of combinations of diazo compounds is often of advantage because crystalline precipitates may be avoided and smoother layers obtained. Furthermore, the use of combinations of solvents may improve the clarity and smoothness of the layers as is well known in the preparation of lacquers and varnishes.

Since according to the described process a positive image is obtained by contact exposure through a positive original, it is of advantage that the diazo compounds decompose readily upon exposure to light. In order to obtain an extraordinarily clean background, chemical substances, such as thiourea, thiosinamine and organic acids in small quantities can be added. It is, however, desirable to use diazo compounds which are distinguished by a high capability of bleaching out or decomposing readily on exposure to light so that it is not necessary to add substances ofthe type mentioned before. The necessity of adding these substances can be determined by a short exposure to light. Resins of fatty acids can also be added to the light sensitive layers.

The base may consist of aluminum or zinc plates or foils or of lithographic stone or glass. Aluminum foils are especially suitable and they may or may not be provided with a thin layer of aluminum oxide by known chemical or electrolytic methods. The surface of aluminum or zinc plates and foils may be slightly roughened by mechanical means to improve adhesion of the light sensitive layer. Moreover, other materials having a non-hydrophilic surface such as woven copper material may be used. In the latter case, alkali soluble resins and dyestuffs soluble in organic solvents may be added advantageously to the layer. According to this procedure colored images are obtained which can be etched exactly like those on zinc or glass plates, or, if foils or woven metal material has been chosen, the copies may be transformed into stencils.

1–3 percent solutions, applied to, preferably, aluminum or zinc plates, produce effective light sensitive materials for lithography. After the evaporation of the solvent, the light sensitive material is ready for use at once. It has good stability and can be stored for a long period of time.

The following examples are inserted in order to illustrate the present invention, but they are not intended to limit the scope thereof:

(1) A 2 percent dioxane (diethylenedioxide) solution of the condensation product obtained by condensing 2 moles of the naphthoquinone-(1,2)-diazide-(2)-5-sulfochloride, (2-diazonaphthol-(1)-5-sulfochloride) with 1 mole of 4-amino-4'-hydroxy-diphenyl, the condensation product corresponding with Formula 1, in aqueous dioxane in the presence of sodium carbonate at slightly elevated temperature, is whirlcoated onto a superficially oxidized aluminum foil. The naphthoquinone-(1,2)-diazide-(2)-5-sulfochloride may be obtained by the reaction of chlorosulfonic acid with 2-diazo-naphthol-(1)-5-sulfonic acid at 50–70° C. After drying, the thus obtained light sensitive foil is exposed to light under a positive original and treated with a saturated solution of disodium phosphate. Subsequently, the light decomposition products which have been formed in the areas struck by light are washed off with water. The positive diazo image thus obtained is very receptive to greasy ink. It can be dried in the usual manner, acidified, washed with water and clamped to the printing machine.

Instead of the diazo compound obtained by condensing 2-diazo-naphthol-(1)-5-sulfochloride with 4-amino-4'-hydroxy-diphenyl the condensation product formed by the condensation of 2 moles of 2-diazonaphthol-(1)-4-sulfochloride with 1 mole of 4-amino-4'-hydroxy-diphenyl can be used, this condensation product corresponding with Formula 2. Another suitable condensation product for preparing the light sensitive layer is obtained by condensing 1 mole of 2,7-aminonaphthol with 2 moles of 2-diazonaphthol-(1)-5-sulfochloride (Formula 3).

(2) 2 parts by weight of the diazo compound obtained by condensing 2 moles of 2-diazonaphthol-(1)-5-sulfochloride and 1 mole of 4-methylamino-1-phenol (Formula 4) are dissolved in 100 parts by weight of dioxane and this solution is applied in the usual manner to a superficially oxidized aluminum foil. After drying, the light sensitive material can be used in the same manner as in Example 1. Or, the layer after exposure to light behind a positive master may be rubbed with greasy printing ink, to thinly and evenly distribute it on the layer and subsequently this ink film may be powdered with talcum. Thereafter, the layer is developed by treating it with 3% solution of trisodium phosphate and subsequently washing it with water, thus removing the light decomposition product in the light exposed areas together with the fatty ink deposited on the decomposed diazo compound, whereas the undecomposed diazo image covered with fatty ink remains. After treatment with a 1% solution of phosphoric acid or the customary gumming of the image, the foil is washed with water and is now ready for printing.

(3) A 2 percent solution of the condensation product obtained by condensing 2 moles of 2-diazo-naphthol-(1)-5-sulfonic acid chloride and 1 mole of 4,4'-diaminobenzophenone in dioxane, which condensation product corresponds with Formula 5, is whirlcoated onto a superficially oxidized aluminum foil. After drying, the light sensitive layer is exposed to light under a master and the light decomposition product in the light exposed areas is removed by wiping with a saturated solution of disodium phosphate and washing with water. Upon subsequent treatment with a 1 percent solution of phosphoric acid, the printing foil can be clamped to a printing machine and copies can be run off therefrom.

Instead of the above mentioned condensation product, the diazo compound conforming to Formula 6 and obtained with the same naphthoquinone-(1,2)-diazide-(2)-5-sulfochloride and 4,4'-diamino-diphenyl-methane can be used.

(4) 2 g. of the condensation product of the probable Formula 7, obtained by the reaction of 2 moles of 2-diazonaphthol-(1)-5-sulfochloride with 1 mole of 4,4'-diaminodiphenyl-piperazine, dissolved in 100 parts of pyridine, is used for the preparation of the light sensitive layer. The solution is applied in the usual manner to an aluminum or zinc foil and the light sensitive material may be treated in the same manner as in Example 1.

(5) A 2 percent solution of the condensation product obtained by condensing 1 mole of 1,6-diamino-hexane with 2 moles of 2-diazonaphthol-(1)-5-sulfochloride, which condensation product corresponds with Formula 8, in a mixture of dioxane and ethylene glycol monomethylether (1:1) is applied to an aluminum plate which has been roughened with a brush. The plate coated in this manner is exposed as usual and the image may be developed with a 5% solution of disodium phosphate.

The condensation product may be prepared by adding a solution of 5.4 g. of 2-diazonaphthol-(1)-5-sulfochloride to a solution of 1.1 g. of 1,6-diamino-hexane in 10 cc. of dioxane. Thereafter, 5 cc. of water and 25 cc. of a 10 percent solution of sodium carbonate are added. A yellow product begins to separate. The solution is heated briefly to 45–50° C., cooled and again diluted with 100 cc. of water in order to complete the precipitation of the condensation product. After acidifying with hydrochloric acid, the separated product is filtered off with a suction filter and neutralized by a washing procedure. After drying, it can be used at once without further cleaning. The diazo compound is very stable and begins to char at approximately 270° C.

In a similar manner, other aliphatic diamines with shorter or longer carbon chains, for instance, ethylene diamine or 1,8-diamino-octane, may be condensed with 2 moles of 2-diazonaphthol-(1)-5-sulfochloride (see Formulae 16 and 17). Generally, diamines with longer chains are more readily soluble in organic solvents. If the condensation product is very difficult to dissolve in the usual solvents, it is advisable to use pyridine as a solvent. This solution is then applied to the base, for example, a superficially oxidized aluminum plate.

1 mole of diethylene triamine may be condensed with 3 moles of 2-diazonaphthol-(1)-5-sulfochloride (see Formula 18). Also 1 mole of a naphthylene diamine, for example, 2,7- or 1,5-naphthylene diamine may be condensed with 2 moles of the diazonaphthol-sulfochloride, the reaction products corresponding with the Formulae 9 and 10 respectively. Similarly, diamino compounds which are substituted several times, for example, bis-(4-amino-2,5-dimethyl-phenyl)-phenyl-methane or bis-(4-amino-2,5-diethoxyphenyl)-phenylmethane the latter of which can be produced by condensing benzaldehyde with 2 moles of amino-hydroquinone-diethylether (compare "Chemisches Centralblatt," 1936, I, page 5024) and corresponds with the formula

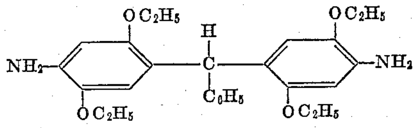

may be condensed with 2 moles of 2-diazonaphthol-(1)-5-sulfochloride or an isomeric orthodiazonaphthol-sulfochloride. Formulae 11 and 12 represent such condensation products. All these condensation products have very good stability and may be used for the preparation of light-sensitive layers for lithography according to procedures similar to those already described.

(6) A solution of 6 g. of naphthoquinone-(1,2)-diazide-(1)-6-sulfochloride in 30 cc. of dioxane is added to a solution of 1.6 g. of 2,7-naphthalene-diamine in 20 cc. of dioxane at a temperature of about 20° C. A 10 percent sodium bicarbonate solution is added to the reaction mixture over a period of half an hour. The reaction mixture is then heated to 40° C. and mixed with as much water as is necessary for completely precipitating the condensation product, which is drawn off, washed with water, and dried. By recrystallizing the condensation product from a mixture of dioxane and water, yellow crystals are obtained which do not melt even at a temperature of 285° C. The diazo compound corresponds to Formula 13.

A 1.5 percent solution of the diazo compound corresponding to Formula 13 in glycol monomethyl ether is coated onto a roughened aluminum foil by means of a plate whirler. After drying the layer thus formed, the foil is exposed to light for 1–2 minutes under a transparent positive pattern. By developing the exposed foil with a 10 percent disodium, or a 1 percent trisodium phosphate solution, a positive image is obtained which is rinsed with water, wiped over with a 1 percent phosphoric acid, and inked with greasy ink. The foil may now be used as a printing plate.

(7) A solution of 5.4 g. of naphthoquinone-(1,2)-diazide-(2)-5-sulfochloride in 25 cc. of dioxane is added to a solution of 3.4 g. of N,N'-dibenzyl-2,7-diamino-naphthalene in 25 cc. of dioxane. 10 cc. of water are added to the reaction mixture, which is then heated to 40–50° C. and mixed with 25 cc. of a 10 percent soda solution. After some time, the condensation product precipitates in the form of an oil. This oil is dissolved in dioxane, and the solution is poured into water, which was weakly acidified with hydrochloric acid, whereupon the yellow colored reaction product precipitates in the form of flakes. The reaction product is drawn off, washed with water, and dried. It corresponds to Formula 14 and decomposes after sintering at about 125° C.

A 1.5 percent solution of the diazo compound corresponding to Formula 14 in ethylene glycol monomethyl ether is coated on a roughened aluminum foil by means of a plate whirler. By exposing the dried light-sensitized foil to light for 1–2 minutes under a transparent pattern and developing it with a 3 percent trisodium phosphate solution, a positive image is obtained. This image is rinsed with water, wiped over with a 1 percent phosphoric acid, and inked with greasy ink. Now the foil is finished for use in printing.

(8) A solution of 5.4 g. of naphthoquinone-(1,2)-diazide-(2)-5-sulfochloride in 25 cc. of dioxane is added to a solution of 2.5 g. of N-benzyl-2,7-amino-naphthol in 20 cc. of dioxane. After addition of 10 cc. of water, the reaction mixture is heated to 40–50° C. and then 25 cc. of a 10 percent soda solution are added. Within half an hour, the condensation product precipitates in the form of an oil. This oil is dissolved in dioxane, and the solution is poured into water which has been weakly acidified with hydrochloric acid, whereupon the reaction product precipitates in form of flakes. It is drawn off, washed with water, and dried. The yellow colored product which corresponds to Formula 15 decomposes after sintering at a temperature of about 125° C.

A 1.5 percent solution of the diazo compound corresponding to Formula 15 in ethylene glycol monomethyl ether is coated on a roughened aluminum foil by means of a plate whirler. After drying the layer thus formed, the light-sensitive foil is exposed to light for 1–2 minutes under a transparent positive pattern and then developed with a 1 percent trisodium phosphate solution. A positive image is obtained. This image is then rinsed with water, wiped over with a 1 percent phosphoric acid and inked with greasy ink. Now the foil is finished for use in printing.

(9) 0.5 part by weight of the diazo compound corresponding to Formula 19 is dissolved in 100 parts by volume of a solvent mixture consisting of equal parts of dimethyl formamide and ethylene glycol monomethyl ether. This solution is used to coat an aluminum foil the surface of which has been roughened. After drying the layer, the light sensitive foil is exposed under a transparent positive master, using as a light-source, e.g. an arc lamp of 18 amps. at a distance of 70 cm., and the exposed foil is subsequently developed by means of a 1 percent trisodium phosphate solution. After development, the foil is rinsed with water, wiped over with a 0.5–1 percent phosphoric acid solution, and then inked with greasy ink. Thus from a positive master, a positive printing plate is obtained.

The diazo compound corresponding to Formula 19 is prepared as follows:

2.1 parts by weight of dianilino-ethane and 6 parts by weight of naphthoquinone-(1,2)-diazide-(2)-5-sulfochloride are added to a mixture consisting of 70 parts by volume of dioxane and 10 parts by volume of pyridine. The reaction mixture is left standing for 2 days at normal temperature and condensation of the sulfochloride with the amino compound occurs. The solution is then poured into a mixture consisting of ice and hydrochloric acid whereupon the sulfonamide precipitates and is separated by means of a suction filter. The diazo compound corresponding to Formula 19 which is thus obtained is dissolved in hot dioxane, the solution is filtered with animal charcoal, and then hot water is added to the filtrate. The diazo compound corresponding to Formula 19, which is thus reprecipitated, is yellow colored, and upon heating decomposes at 155° C.

(10) In accordance with the method stated in Example 9, a solution is prepared of 0.5 part by weight of the diazo compound corresponding to Formula 20. As described in Example 9, a printing plate is produced with this solution. For developing the exposed foil, a 5–10 percent disodium phosphate solution is used in this case. As in Example 9, a positive printing plate is obtained from a positive master.

The diazo compound corresponding to Formula 20 is prepared analogously to the diazo compound corresponding to Formula 19, i.e. by condensing naphthoquinone-(1,2)-diazide-(2)-4-sulfochloride with dianilino-ethane. The diazo compound corresponding to Formula 20, which is thus obtained, is a yellow powder which melts at about 170° C. with decomposition.

(11) To prepare the compound corresponding to Formula 21, a solution of 9.2 g. (1/20 mole) of benzidine in 150 cc. of dioxane is first mixed with 50 cc. of water and 50 cc. of a 10 percent sodium carbonate solution and then combined, at room temperature, while stirring and slightly shaking, with a solution of 27 g. (1/10 mole) of naphthoquinone-(1,2)-diazide-(2)-sulfonic acid chloride-(5) in 125 cc. of dioxane. The mixture is heated to 40° C. and further stirred for 10 to 20 minutes after adding about 25 cc. of a 10 percent sodium carbonate solution in order to complete the reaction. The reaction mixture is poured into water acidified with hydrochloric acid, whereupon the reaction product precipitates; it is filtered off and washed with water. For further purification, the product is dissolved in a suitable solvent, e.g. dioxane, acetone or ethylene glycol monomethyl ether and, after filtration over charcoal, reprecipitated from the solution by the addition of water. After filtration, washing and drying, a yellow-colored product is obtained.

(12) To prepare the compound corresponding to Formula 22, a solution of 5.4 g. (1/20 mole) of 1,4-diamino-benzene in 150 cc. of dioxane is first mixed with 50 cc. of water and 50 cc. of a 10 percent sodium carbonate solution and then combined, at room temperature, while stirring and slightly shaking, with a solution of 27 g. (1/10 mole) of naphthoquinone-(1,2)-diazide-(2)-sulfonic acid chloride-(5) in 125 cc. of dioxane. The mixture is heated to 40° C. and further stirred for 10 to 20 minutes after adding about 25 cc. of a 10 percent sodium carbonate solution in order to complete the reaction. The reaction mixture is poured into water acidified with hydrochloric acid, whereupon the reaction product precipitates; it is filtered off and washed with water. For further purification, the product is dissolved in a suitable solvent, e.g. dioxane, acetone or ethylene glycol monomethyl ether and, after filtration over charcoal, reprecipitated from the solution by the addition of water. After filtration, washing and drying, a yellow-colored product is obtained.

(13) To prepare the compound of Formula 23, a solution of 12.2 g. ($\frac{1}{20}$ mole) of 4,4′-diamino-3,3′-dimethoxy-diphenyl in 150 cc. of dioxane is first mixed with 50 cc. of water and 50 cc. of a 10 percent sodium carbonate solution and then combined, at room temperature, while stirring and slightly shaking, with a solution of 27 g. ($\frac{1}{10}$ mole) of naphthoquinone-(1,2)-diazide-(2)-sulfonic acid chloride-(5) in 125 cc. of dioxane. The mixture is heated to 40° C. and further stirred for 10 to 20 minutes after adding about 25 cc. of a 10 percent sodium carbonate solution in order to complete the reaction. The reaction mixture is poured into water acidified with hydrochloric acid, whereupon the reaction product precipitates; it is filtered off and washed with water. For further purification, the product is dissolved in a suitable solvent, e.g. dioxane, acetone or ethylene glycol monomethyl ether and, after filtration over charcoal, reprecipitated from the solution by the addition of water. After filtration, washing and drying, a yellow-brown product is obtained.

(14) To prepare the compound of Formula 24, a solution of 10.6 g. ($\frac{1}{20}$ mole) of 4,4′-diamino-benzophenone in 150 cc. of dioxane is first mixed with 50 cc. of water and 50 cc. of a 10 percent sodium carbonate solution and then combined, at room temperature, while stirring and slightly shaking, with a solution of 27 g. ($\frac{1}{10}$ mole) of naphthoquinone-(1,2)-diazide-(2)-sulfonic acid chloride-(4) in 125 cc. of dioxane. The mixture is heated to 40° C. and further stirred for 10 to 20 minutes after adding about 25 cc. of a 10 percent sodium carbonate solution in order to complete the reaction. The reaction mixture is poured into water acidified with hydrochloric acid, whereupon the reaction product precipitates; it is filtered off and washed with water. For further purification, the product is dissolved in a suitable solvent, e.g. dioxane, acetone or ethylene glycol monomethyl ether and, after filtration over charcoal, reprecipitated from the solution by the addition of water. After filtration, washing and drying, a yellow-colored product is obtained.

(15) To prepare the compound of Formula 25, a solution of 12.5 g. ($\frac{1}{20}$ mole) of 4,4′-diamino-diphenyl-cyclohexylmethane in 150 cc. of dioxane is first mixed with 50 cc. of water and 50 cc. of a 10 percent sodium carbonate solution and then combined, at room temperature, while stirring and slightly shaking, with a solution of 27 g. ($\frac{1}{10}$ mole) of naphthoquinone-(1,2)-diazide-(2)-sulfonic acid chloride-(5) in 125 cc. dioxane. The mixture is heated to 40° C. and further stirred for 10 to 20 minutes after adding about 25 cc. of a 10 percent sodium carbonate solution in order to complete the reaction. The reaction mixture is poured into water acidified with hydrochloric acid, whereupon the reaction product precipitates; it is filtered off and washed with water. For further purification, the product is dissolved in a suitable solvent, e.g. dioxane, acetone or ethylene glycol monomethyl ether and, after filtration over charcoal, reprecipitated from the solution by the addition of water. After filtration, washing and drying a yellow-colored product is obtained.

(16) In order to prepare planographic printing plates using the compounds of Formulae 21 to 25, the general procedure of Example 1 above is followed, i.e., the compound is dissolved in an organic solvent and coated onto a support, e.g., a metal foil.

From this copying material, copies are obtained by exposure to light under a master, the copies then being developed with a 10 percent disodium phosphate solution to produce printing plates. Positive images are obtained from positive masters.

This application is a continuation-in-part of application Serial No. 718,453, filed March 3, 1958, which application is, in turn, a continuation-in-part of application Serial No. 517,086, filed June 21, 1955, now abandoned, which application was in turn a continuation-in-part of application Serial No. 208,055, filed January 26, 1951, and now abandoned.

It will be obvious to those skilled in the art that many modifications may be made within the scope of the present invention without departing from the spirit thereof, and the invention includes all such modifications.

What is claimed is:

1. A presensitized printing plate comprising a base material having a coating thereon comprising a compound having the formula

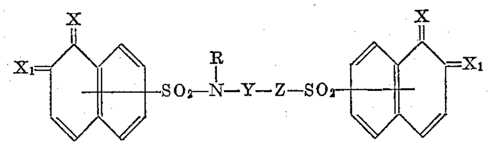

in which X and $X_1$ are selected from the group consisting of $N_2$ and O, those attached to the same ring being different, Y is selected from the group consisting of alkylene and arylene groups, Z is selected from the group consisting of oxygen and —$NR_1$— groups, and R and $R_1$ are selected from the group consisting of hydrogen, lower alkyl groups, and aryl groups.

2. A presensitized printing plate comprising a base material having a coating thereon comprising a compound having the formula

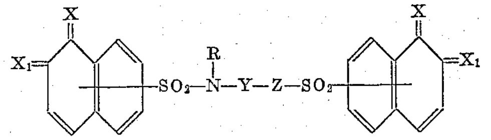

in which X and $X_1$ are selected from the group consisting of $N_2$ and O, those attached to the same ring being different, Y is an alkylene group, Z is selected from the group consisting of oxygen and —$NR_1$— groups and R and $R_1$ are selected from the group consisting of hydrogen, lower alkyl groups, and aryl groups.

3. A presensitized printing plate comprising a base material having a coating thereon comprising a compound having the formula

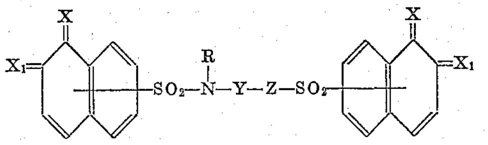

in which X and $X_1$ are selected from the group consisting of $N_2$ and O, those attached to the same ring being different, Y is an arylene group, Z is selected from the group consisting of oxygen and —$NR_1$— groups, and R and $R_1$ are selected from the group consisting of hydrogen, lower alkyl groups, and aryl groups.

4. A presensitized printing plate comprising a base material having a coating thereon comprising a compound having the formula

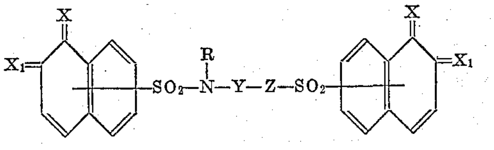

in which X and $X_1$ are selected from the group consisting of $N_2$ and O, those attached to the same ring being different, Y is a diarylene group, Z is selected from the group consisting of oxygen and —$NR_1$— groups, and R and $R_1$ are selected from the group consisting of hydrogen, lower alkyl groups, and aryl groups.

5. A presensitized printing plate comprising a base material having a coating thereon comprising a compound having the formula

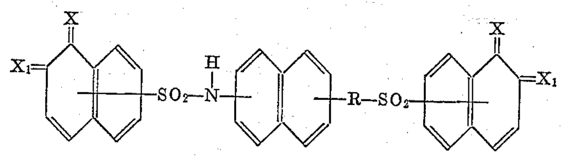

in which X and $X_1$ are selected from the group consisting of $N_2$ and O, those attached to the same ring being different, and R is selected from the group consisting of —NH— and —O— groups.

6. A presensitized printing plate comprising a base material having a coating thereon comprising a compound having the formula

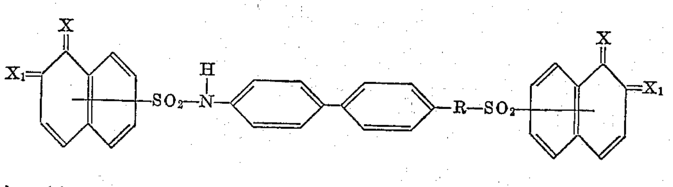

in which X and $X_1$ are selected from the group consisting of $N_2$ and O, those attached to the same ring being different, and R is selected from the group consisting of —NH— and —O— groups.

7. A presensitized printing plate comprising a base material having a coating thereon comprising a compound having the formula

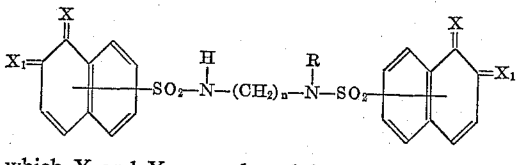

in which X and $X_1$ are selected from the group consisting of $N_2$ and O, those attached to the same ring being different, $n$ is an integer from 1 to 20, and R is selected from the group consisting of hydrogen and lower alkyl groups.

8. A presensitized printing plate comprising a base material having a coating thereon comprising a compound having the formula

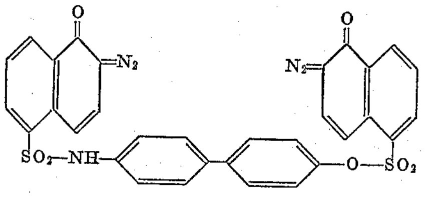

9. A presensitized printing plate comprising a base material having a coating thereon comprising a compound having the formula

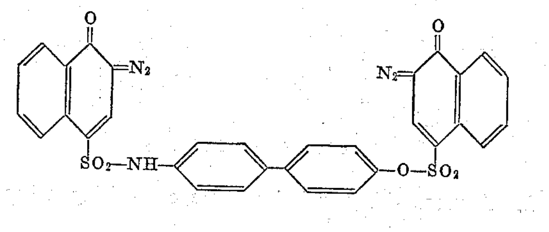

10. A presensitized printing plate comprising a base material having a coating thereon comprising a compound having the formula

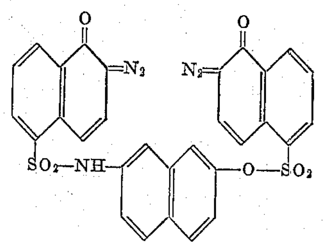

11. A presensitized printing plate comprising a base material having a coating thereon comprising a compound having the formula

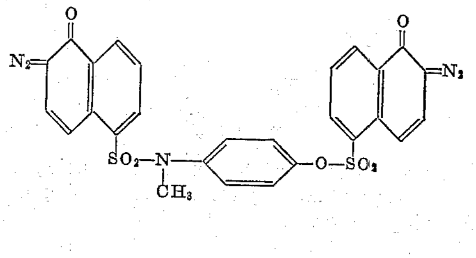

12. A presensitized printing plate comprising a base material having a coating thereon comprising a compound having the formula

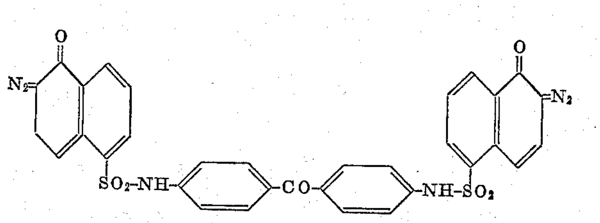

13. A presensitized printing plate comprising a base material having a coating thereon comprising a compound having the formula

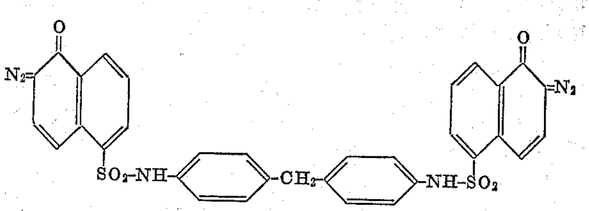

14. A presensitized printing plate comprising a base material having a coating thereon comprising a compound having the formula

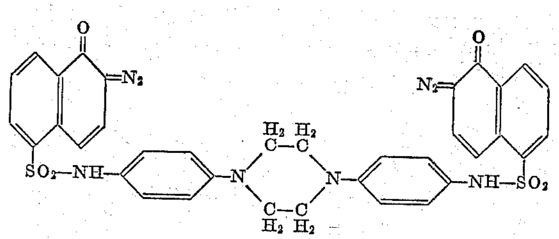

15. A presensitized printing plate comprising a base material having a coating thereon comprising a compound having the formula

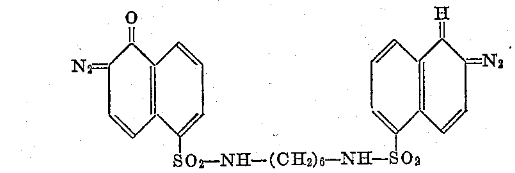

16. A presensitized printing plate comprising a base material having a coating thereon comprising a compound having the formula

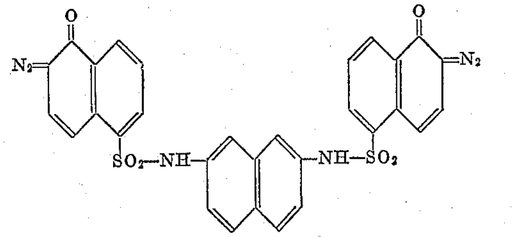

17. A presensitized printing plate comprising a base material having a coating thereon comprising a compound having the formula

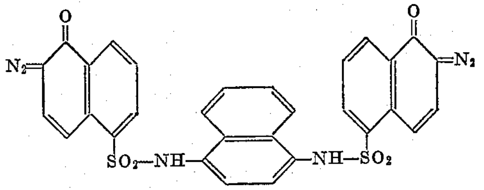

18. A presensitized printing plate comprising a base material having a coating thereon comprising a compound having the formula

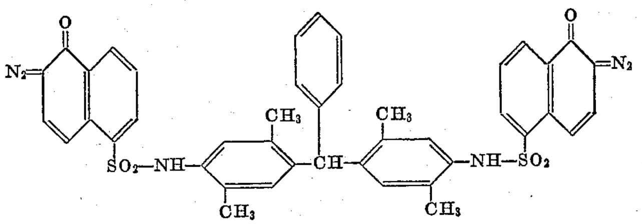

19. A presensitized printing plate comprising a base material having a coating thereon comprising a compound having the formula

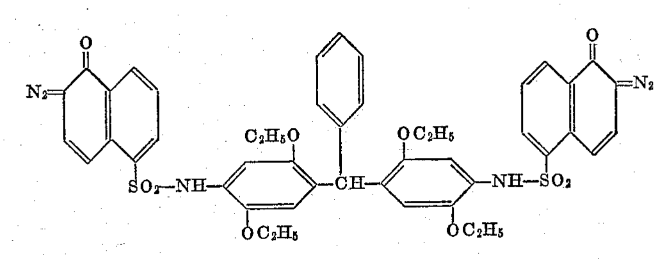

20. A presensitized printed plate comprising a base material having a coating thereon comprising a compound having the formula

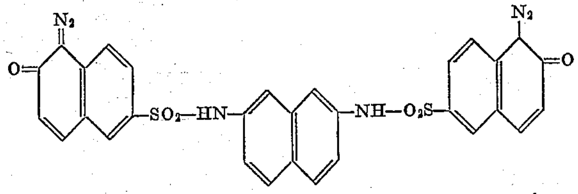

21. A presensitized printing plate comprising a base material having a coating thereon comprising a compound having the formula

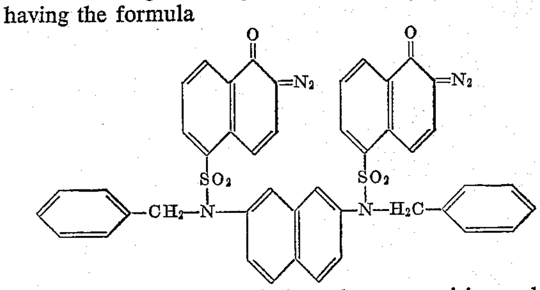

22. A presensitized printing plate comprising a base material having a coating thereon comprising a compound having the formula

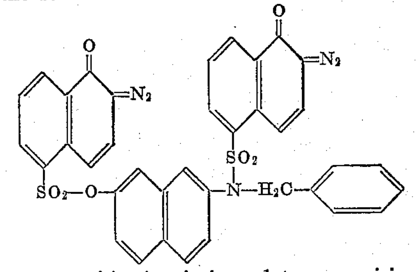

23. A presensitized printing plate comprising a base material having a coating thereon comprising a compound having the formula

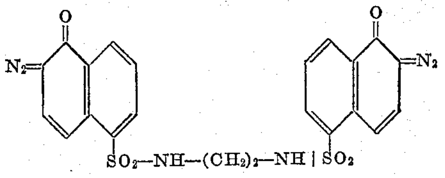

24. A presensitized printing plate comprising a base material having a coating thereon comprising a compound having the formula

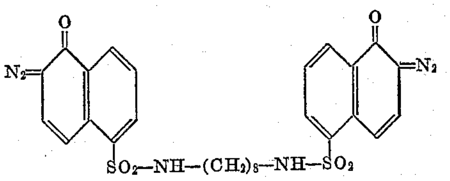

25. A presensitized printing plate comprising a base material having a coating thereon comprising a compound having the formula

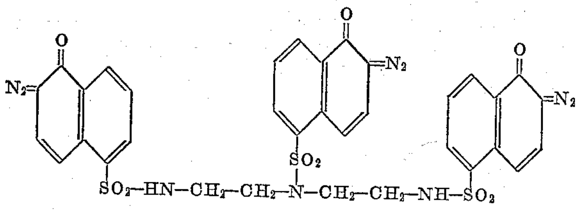

26. A presensitized printing plate comprising a base material having a coating thereon comprising a compound having the formula

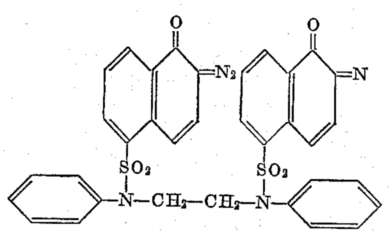

27. A presensitized printing plate comprising a base material having a coating thereon comprising a compound having the formula

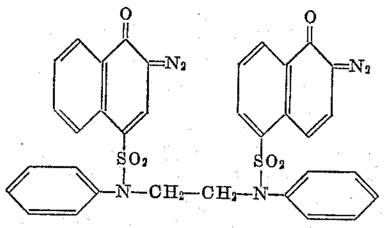

28. A presensitized printing plate comprising a base material having a coating thereon comprising a compound having the formula

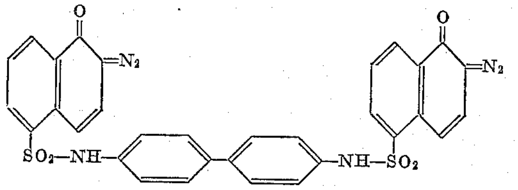

29. A presensitized printing plate comprising a base material having a coating thereon comprising a compound having the formula

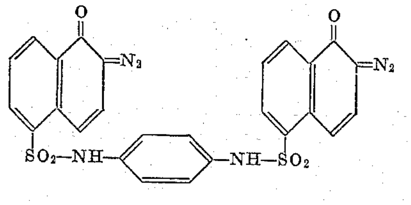

30. A presensitized printing plate comprising a base material having a coating thereon comprising a compound having the formula

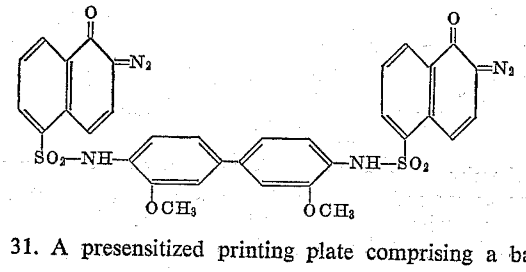

31. A presensitized printing plate comprising a base material having a coating thereon comprising a compound having the formula

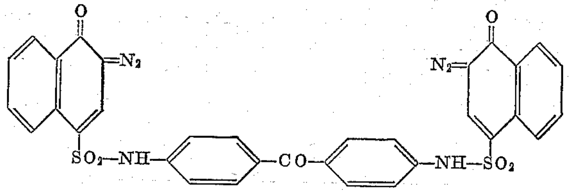

32. A presensitized printing plate comprising a base material having a coating thereon comprising a compound having the formula

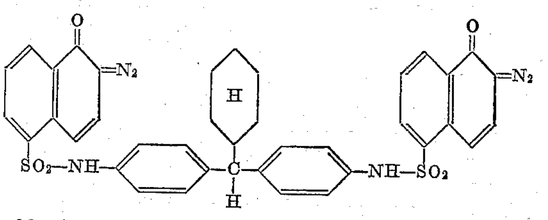

33. A process for developing a printing plate which comprises exposing to light under a master a base material having a compound thereon of the formula

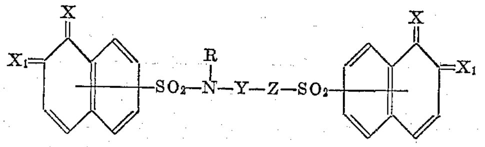

in which X and $X_1$ are selected from the group consisting of $N_2$ and O, those attached to the same ring being different, Y is selected from the group consisting of alkylene and arylene groups, Z is selected from the group consisting of oxygen and $—NR_1—$ groups and R and $R_1$ are selected from the group consisting of hydrogen, lower alkyl groups, and aryl groups, to thereby form a decomposition product in the light struck areas and removing the decomposition product by treatment with a weakly alkaline solution.

34. A process for developing a printing plate which comprises exposing to light under a master a base material having a compound thereon of the formula

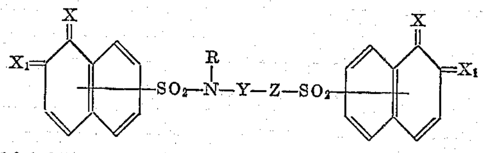

in which X and $X_1$ are selected from the group consisting of $N_2$ and O, and those attached to the same ring being different, Y is an alkylene group, Z is selected from the group consisting of oxygen and $—NR_1—$ groups, and R and $R_1$ are selected from the group consisting of hydrogen, lower alkyl groups, and aryl groups, to thereby form a decomposition product in the light struck areas and removing the decomposition product by treatment with a weakly alkaline solution.

35. A process for developing a printing plate which comprises exposing to light under a master a base material having a compound thereon of the formula

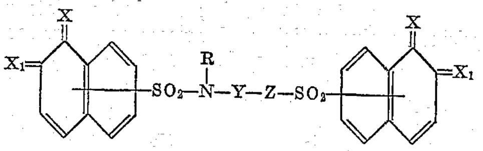

in which X and $X_1$ are selected from the group consisting of $N_2$ and O, those attached to the same ring being different, Y is an arylene group, Z is selected from the group consisting of oxygen and $—NR_1—$ groups, and R and $R_1$ are selected from the group consisting of hydrogen, lower alkyl groups, and aryl groups, to thereby form a decomposition product in the light struck areas and removing the decomposition product by treatment with a weakly alkaline solution.

36. A process for developing a printing plate which comprises exposing to light under a master a base material having a compound thereon of the formula

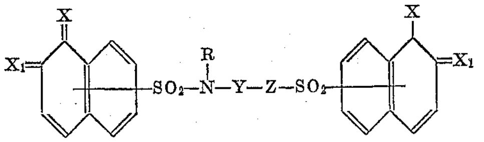

in which X and $X_1$ are selected from the group consisting of $N_2$ and O, those attached to the same ring being different, Y is a diarylene group, Z is selected from the group consisting of oxygen and —$NR_1$— groups, and R and $R_1$ are selected from the group consisting of hydrogen, lower alkyl groups, and aryl groups, to thereby form a decomposition product in the light struck areas and removing the decomposition product by treatment with a weakly alkaline solution.

37. A process for developing a printing plate which comprises exposing to light under a master a base material having a compound thereon of the formula

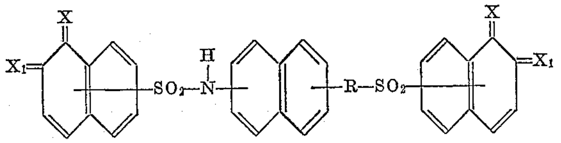

in which X and $X_1$ are selected from the group consisting of $N_2$ and O, those attached to the same ring being different, and R is selected from the group consisting of —NH— and —O— groups.

38. A process for developing a printing plate which comprises exposing to light under a master a base material having a compound thereon of the formula

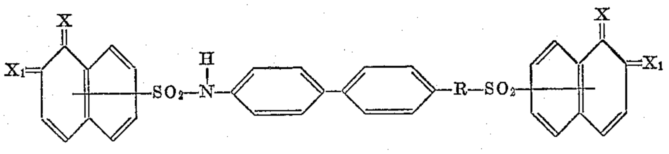

in which X and $X_1$ are selected from the group consisting of $N_2$ and O, those attached to the same ring being different, and R is selected from the group consisting of —NH— and —O— groups.

39. A process for developing a printing plate which comprises exposing to light under a master a base material having a compound thereon of the formula

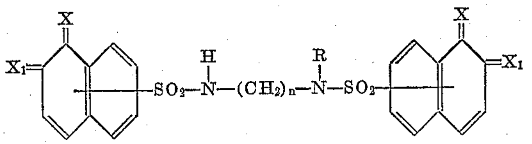

in which X and $X_1$ are selected from the group consisting of $N_2$ and O, those attached to the same ring being different, $n$ is an integer from 1 to 20, and R is selected from the group consisting of hydrogen and lower alkyl groups.

40. A process for developing a printing plate which comprises exposing to light under a master a base material having a compound thereon of the formula

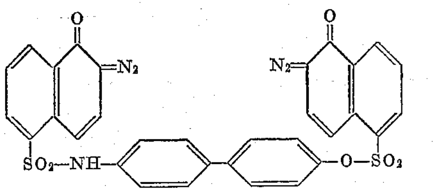

to thereby form a decomposition product in the light struck areas and removing the decomposition product by treatment with a weakly alkaline solution.

41. A process for developing a printing plate which comprises exposing to light under a master a base material having a compound thereon of the formula

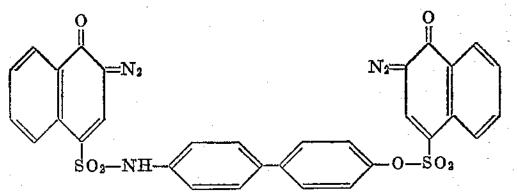

to thereby form a decomposition product in the light struck areas and removing the decomposition product by treatment with a weakly alkaline solution.

42. A process for developing a printing plate which comprises exposing to light under a master a base material having a compound thereon of the formula

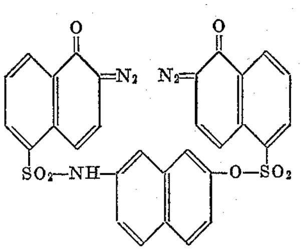

to thereby form a decomposition product in the light struck areas and removing the decomposition product by treatment with a weakly alkaline solution.

43. A process for developing a printing plate which comprises exposing to light under a master a base material having a compound thereon of the formula

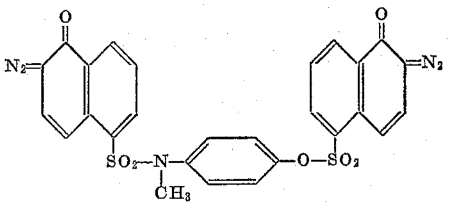

to thereby form a decomposition product in the light struck areas and removing the decomposition product by treatment with a weakly alkaline solution.

44. A process for developing a printing plate which comprises exposing to light under a master a base material having a compound thereon of the formula

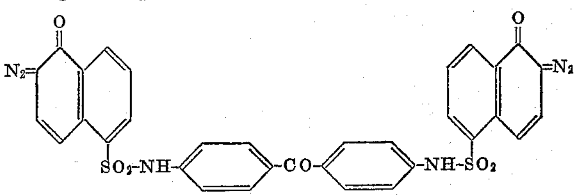

to thereby form a decomposition product in the light struck areas and removing the decomposition product by treatment with a weakly alkaline solution.

45. A process for developing a printing plate which comprises exposing to light under a master a base material having a compound thereon of the formula

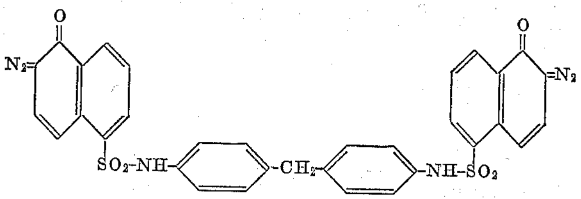

to thereby form a decomposition product in the light struck areas and removing the decomposition product by treatment with a weakly alkaline solution.

46. A process for developing a printing plate which comprises exposing to light under a master a base material having a compound thereon of the formula

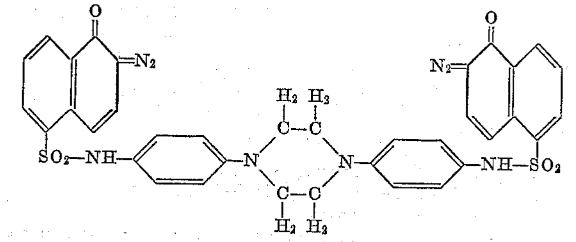

to thereby form a decomposition product in the light struck areas and removing the decomposition product by treatment with a weakly alkaline solution.

47. A process for developing a printing plate which comprises exposing to light under a master a base material having a compound thereon of the formula

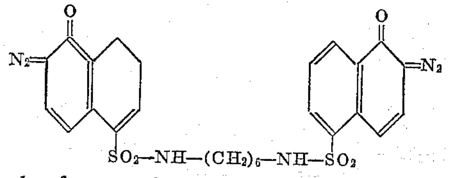

to thereby form a decomposition product in the light struck areas and removing the decomposition product by treatment with a weakly alkaline solution.

48. A process for developing a printing plate which comprises exposing to light under a master a base material having a compound thereon of the formula

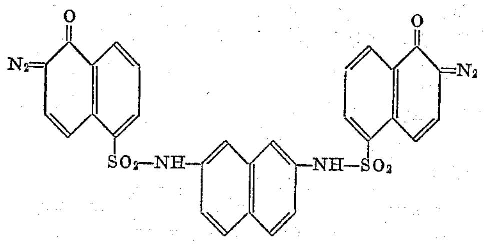

to thereby form a decomposition product in the light struck areas and removing the decomposition product by treatment with a weakly alkaline solution.

49. A process for developing a printing plate which comprises exposing to light under a master a base material having a compound thereon of the formula

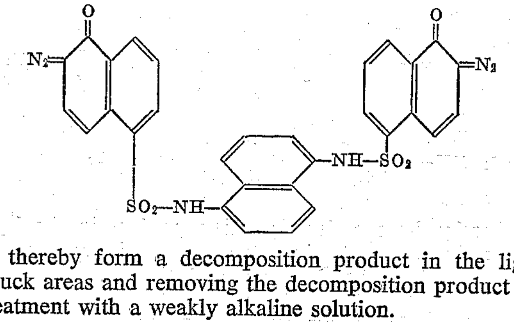

to thereby form a decomposition product in the light struck areas and removing the decomposition product by treatment with a weakly alkaline solution.

50. A process for developing a printing plate which comprises exposing to light under a master a base material having a compound thereon of the formula

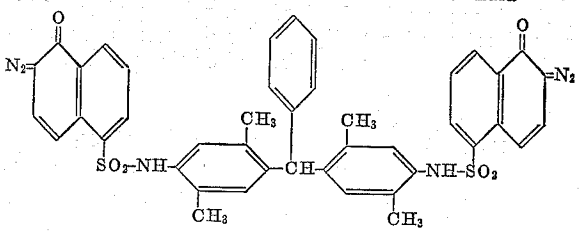

to thereby form a decomposition product in the light struck areas and removing the decomposition product by treatment with a weakly alkaline solution.

51. A process for developing a printing plate which comprises exposing to light under a master a base material having a compound thereon of the formula

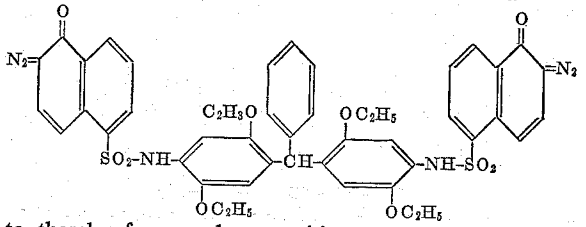

to thereby form a decomposition product in the light struck areas and removing the decomposition product by treatment with a weakly alkaline solution.

52. A process for developing a printing plate which comprises exposing to light under a master a base material having a compound thereon of the formula

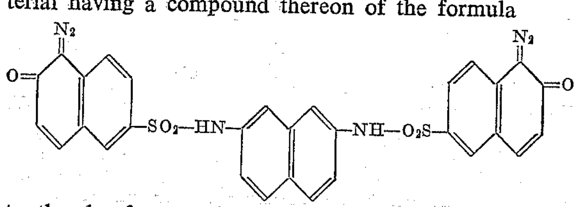

to thereby form a decomposition product in the light struck areas and removing the decomposition product by treatment with a weakly alkaline solution.

53. A process for developing a printing plate which comprises exposing to light under a master a base material having a compound thereon of the formula

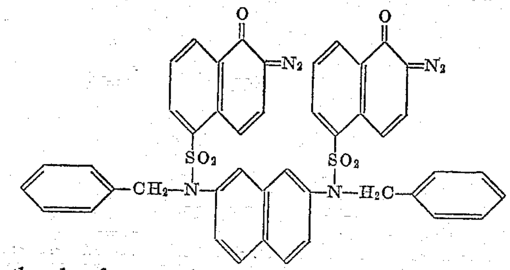

to thereby form a decomposition product in the light struck areas and removing the decomposition product by treatment with a weakly alkaline solution.

54. A process for developing a printing plate which comprises exposing to light under a master a base material having a compound thereon of the formula

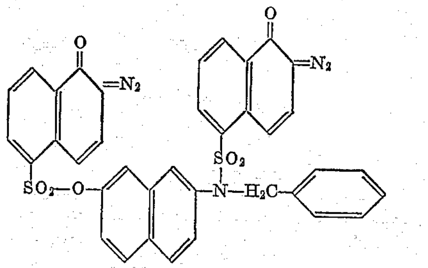

to thereby form a decomposition product in the light struck areas and removing the decomposition product by treatment with a weakly alkaline solution.

55. A process for developing a printing plate which comprises exposing to light under a master a base haterial having a compound thereon of the formula

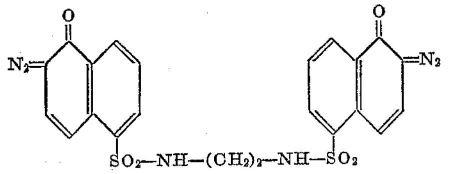

to thereby form a decomposition product in the light struck areas and removing the decomposition product by treatment with a weakly alkaline solution.

56. A process for developing a printing plate which comprises exposing to light under a master a base material having a compound thereon of the formula

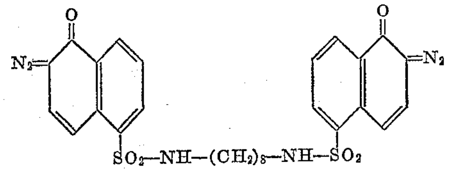

to thereby form a decomposition product in the light struck areas and removing the decomposition product by treatment with a weakly alkaline solution.

57. A process for developing a printing plate which comprises exposing to light under a master a base material having a compound thereon of the formula

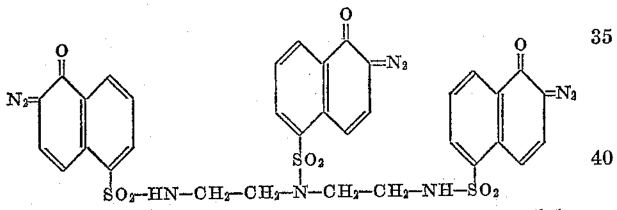

to thereby form a decomposition product in the light struck areas and removing the decomposition product by treatment with a weakly alkaline solution.

58. A process for developing a printing plate which comprises exposing to light under a master a base material having a compound thereon of the formula

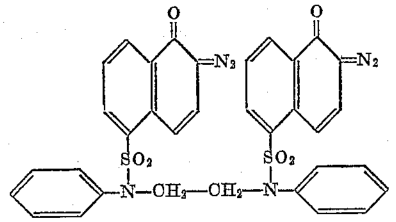

to thereby form a decomposition product in the light struck areas and removing the decomposition product by treatment with a weakly alkaline solution.

59. A process for developing a printing plate which comprises exposing to light under a master a base material having a compound thereon of the formula

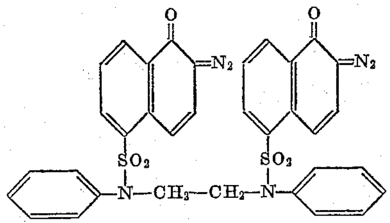

to thereby form a decomposition product in the light struck areas and removing the decomposition product by treatment with a weakly alkaline solution.

60. A process for developing a printing plate which comprises exposing to light under a master a base material having a compound thereon of the formula

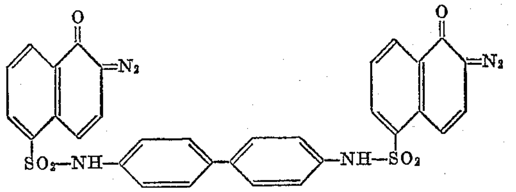

to thereby form a decomposition product in the light struck areas and removing the decomposition product by treatment with a weakly alkaline solution.

61. A process for developing a printing plate which comprises exposing to light under a master a base material having a compound thereon of the formula

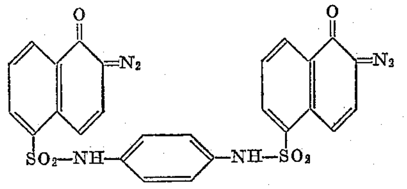

to thereby form a decomposition product in the light struck areas and removing the decomposition product by treatment with a weakly alkaline solution.

62. A process for developing a printing plate which comprises exposing to light under a master a base material having a compound thereon of the formula

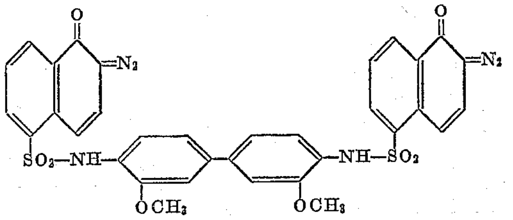

to thereby form a decomposition product in the light struck areas and removing the decomposition product by treatment with a weakly alkaline solution.

63. A process for developing a printing plate which comprises exposing to light under a master a base material having a compound thereon of the formula

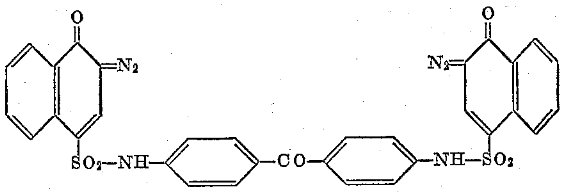

to thereby form a decomposition product in the light struck areas and removing the decomposition product by treatment with a weakly alkaline solution.

64. A process for developing a printing plate which comprises exposing to light under a master a base material having a compound thereon of the formula

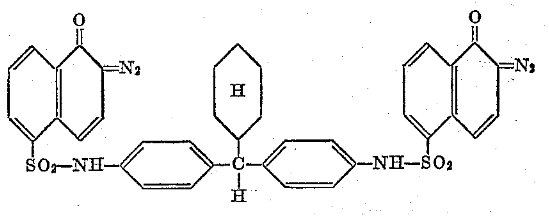

to thereby form a decomposition product in the light struck areas and removing the decomposition product by treatment with a weakly alkaline solution.

(References on following page)

References Cited in the file of this patent

FOREIGN PATENTS

| | | |
|---|---|---|
| 500,222 | Belgium | Jan. 15, 1951 |
| 504,899 | Belgium | Aug. 14, 1951 |
| 508,016 | Belgium | Jan. 15, 1952 |
| 510,151 | Belgium | Apr. 15, 1952 |
| 904,255 | France | Feb. 15, 1945 |
| 872,154 | Germany | Mar. 30, 1953 |
| 879,203 | Germany | June 11, 1953 |

OTHER REFERENCES

PB, 1308, Oct. 9, 1945, pages 36–41.

PB, 25,781, Microfilm Frames, 549, 550.

PB, 17547–S3, Abstract of German application K 169,-065.